(12) United States Patent
Payne

(10) Patent No.: US 11,511,615 B2
(45) Date of Patent: Nov. 29, 2022

(54) HYBRID DRIVE TRANSMISSION WITH E-MOTOR ROTOR RESOLVER INTEGRATED WITH AUXILIARY DRIVE

(71) Applicant: Schaeffler Technologies AG & Co. KG, Herzogenaurach (DE)

(72) Inventor: Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 90 days.

(21) Appl. No.: 17/213,364

(22) Filed: Mar. 26, 2021

(65) Prior Publication Data

US 2022/0305900 A1  Sep. 29, 2022

(51) Int. Cl.
| | |
|---|---|
| *B60K 6/405* | (2007.10) |
| *B60K 25/06* | (2006.01) |
| *F16H 57/02* | (2012.01) |
| *F16H 45/00* | (2006.01) |

(52) U.S. Cl.
CPC ............. *B60K 6/405* (2013.01); *B60K 25/06* (2013.01); *F16H 45/00* (2013.01); *F16H 57/02* (2013.01); *B60K 2025/065* (2013.01); *F16H 2057/02026* (2013.01); *F16H 2057/02034* (2013.01); *F16H 2057/02043* (2013.01)

(58) Field of Classification Search
CPC .. B60K 6/405; B60K 25/06; B60K 2025/065; F16H 45/00; F16H 57/02; F16H 2057/02026; F16H 2057/02034; F16H 2057/02043
See application file for complete search history.

(56) References Cited

U.S. PATENT DOCUMENTS

| | | | | |
|---|---|---|---|---|
| 6,258,001 | B1 * | 7/2001 | Wakuta | B60K 6/48 903/952 |
| 6,478,101 | B1 * | 11/2002 | Taniguchi | B60K 6/547 903/905 |
| 6,935,450 | B1 * | 8/2005 | Tsuzuki | B60K 6/383 180/65.26 |
| 7,017,693 | B2 * | 3/2006 | Omote | B60L 50/16 477/3 |

* cited by examiner

*Primary Examiner* — Thomas C Diaz
(74) *Attorney, Agent, or Firm* — Volpe Koenig

(57) ABSTRACT

A transmission with an integrated hybrid drive is provided that includes a transmission housing as well as a torque converter rotatably mounted within the transmission housing. The torque converter includes an outer shell configured to be drivingly connected to a crankshaft. An e-motor is integrated into the transmission and includes a stator connected to the transmission housing, a rotor connected to the outer shell, and a controller. An auxiliary drive unit is provided having a drive shaft that is driven by a connection to the torque converter outer shell. A rotor position sensor (RPS) is provided on the drive shaft that is configured to signal rotor position data to the controller. The drive shaft and RPS are offset relative to the axis of the rotor and torque converter, providing better space utilization.

18 Claims, 2 Drawing Sheets

HYBRID DRIVE TRANSMISSION WITH E-MOTOR ROTOR RESOLVER INTEGRATED WITH AUXILIARY DRIVE

FIELD OF INVENTION

The present disclosure relates to hybrid vehicle drive transmissions which include an electric motor (E-motor) integrated into the transmission, which is located in the drive line between the internal combustion and the driven wheels, to provide drive torque from the E-motor in addition to or in place of the drive torque from the internal combustion engine.

BACKGROUND

Hybrid vehicle drive transmissions are known which include an integrated E-motor. In order to control the E-motor, the position of the rotor has to be sensed and the rotor position data signaled to the controller for the E-motor. Basically, all known electric drives are controlled using a rotor position sensor (RPS) that is located coaxial with the E-motor. This can involve complex and/or custom designed rotary resolvers or encoders to fit in the space adjacent to the rotor or around the torque converter hub that extends from the torque converter outer shell to which the rotor is directly mounted.

A coaxial architecture is optimal depending on the available space; however, in view of the shrinking space available in hybrid vehicle drive transmissions, alternative solutions may be advantageous for additional space saving as well as reduced costs.

SUMMARY

In one aspect, a transmission with an integrated hybrid drive is provided that includes a transmission housing as well as a torque converter rotatably mounted within the transmission housing. The torque converter includes an outer shell with an impeller pump configured to be drivingly connected to a crankshaft, and a turbine within the outer shell that is connected to an output shaft. An e-motor is integrated into the transmission and includes a stator connected to the transmission housing, a rotor connected to the outer shell of the torque converter, and a controller. An auxiliary drive unit is provided having a drive shaft that is driven by a connection to the torque converter outer shell. A rotor position sensor (RPS) is provided on the drive shaft that is configured to signal rotor position data to the controller. This arrangement allows for offset positioning of the RPS relative to the axis of the rotor and torque converter, which provides for better space utilization and also allows for a standard RPS to be utilized.

In one embodiment, the auxiliary drive unit is an oil pump. The oil pump is preferably located on a side of the transmission housing opposite from a torque converter side, and the drive shaft for the auxiliary drive extends through the transmission housing. The RPS is positioned on the torque converter side of the transmission housing.

For this arrangement, the torque converter further includes a torque converter pump hub, and a chain drive extends between the torque converter pump hub and the drive shaft for the auxiliary drive. This is similar to a prior known oil pump arrangement, except for the drive shaft extending through the transmission housing to the torque converter side, and the RPS being positioned on the drive shaft for the oil pump.

Preferably, a drive ratio of the torque converter pump hub to the drive shaft is 1:1. However, this does not need to be the case and the controller can be adjusted or calibrated to compensate for other drive ratios so that the rotor speed is determined. For example, the drive ratio could be from 1:2 to 1:6, although other ratios are also possible.

In one arrangement, the RPS is mounted to the transmission housing, and a resolver housing is mounted over the rotor position sensor. Preferably the resolver housing is sealed to the transmission housing to provide a water-tight enclosure for the RPS. This is a requirement for some transmissions that have specific wet running capabilities.

The transmission may further include a flex plate that is drivingly connected to the torque converter outer shell and configured to be connected to the crankshaft. The flex plate operates in a known manner to smooth the variations in drive torque from the internal combustion engine.

The auxiliary drive unit can be for something other than the oil pump and could possibly also be just comprised of the drive shaft that is solely used for the RPS. In any case, the auxiliary drive is located on a side of the transmission housing opposite from a torque converter side, and the drive shaft extends through the transmission housing and the RPS is positioned on the drive shaft on the torque converter side of the transmission housing. The drive shaft can be driven with a chain and sprocket drive arrangement from the torque converter hub, or can be a direct gear drive.

The benefit of this arrangement is that based on the drive shaft being mounted parallel to and offset from an axis of the torque converter, multiple different locations for the RPS can be utilized depending on other space requirements in the transmission.

The RPS is preferably a rotary resolver or rotary encoder. Although any type of sensor can be used that is configured to sense rotary position.

In another aspect, a transmission with an integrated hybrid drive is provided that includes a transmission housing and a torque converter rotatably mounted within the transmission housing. The torque converter including an outer shell and a pump hub. An E-motor is provided having a stator connected to the transmission housing, a rotor connected to the outer shell, and a controller. An oil pump is provided having a drive shaft that is driven by a connection to the torque converter pump hub. A RPS is located on the drive shaft and is configured to signal rotor position data to the controller.

Here, similar features to those discussed above are used specifically in connection with the oil pump RPS arrangement. The location of the RPS on the oil pump drive shaft can be useful when designing hybrid drive transmissions having common parts and/or common designs with existing transmissions in order to take advantage of the already existing transmission oil pump drive design and/or components thereof.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. A reference to a list of items that are cited as "at least one of a, b, or c" (where a, b, and c represent the items being listed) means any single one of the items a, b, or c, or combinations thereof. The terms "generally" and "approximately" mean within +/−10% of the indicated value. The terminology includes the words specifically noted above, derivatives thereof and words of similar import.

Figure 1:
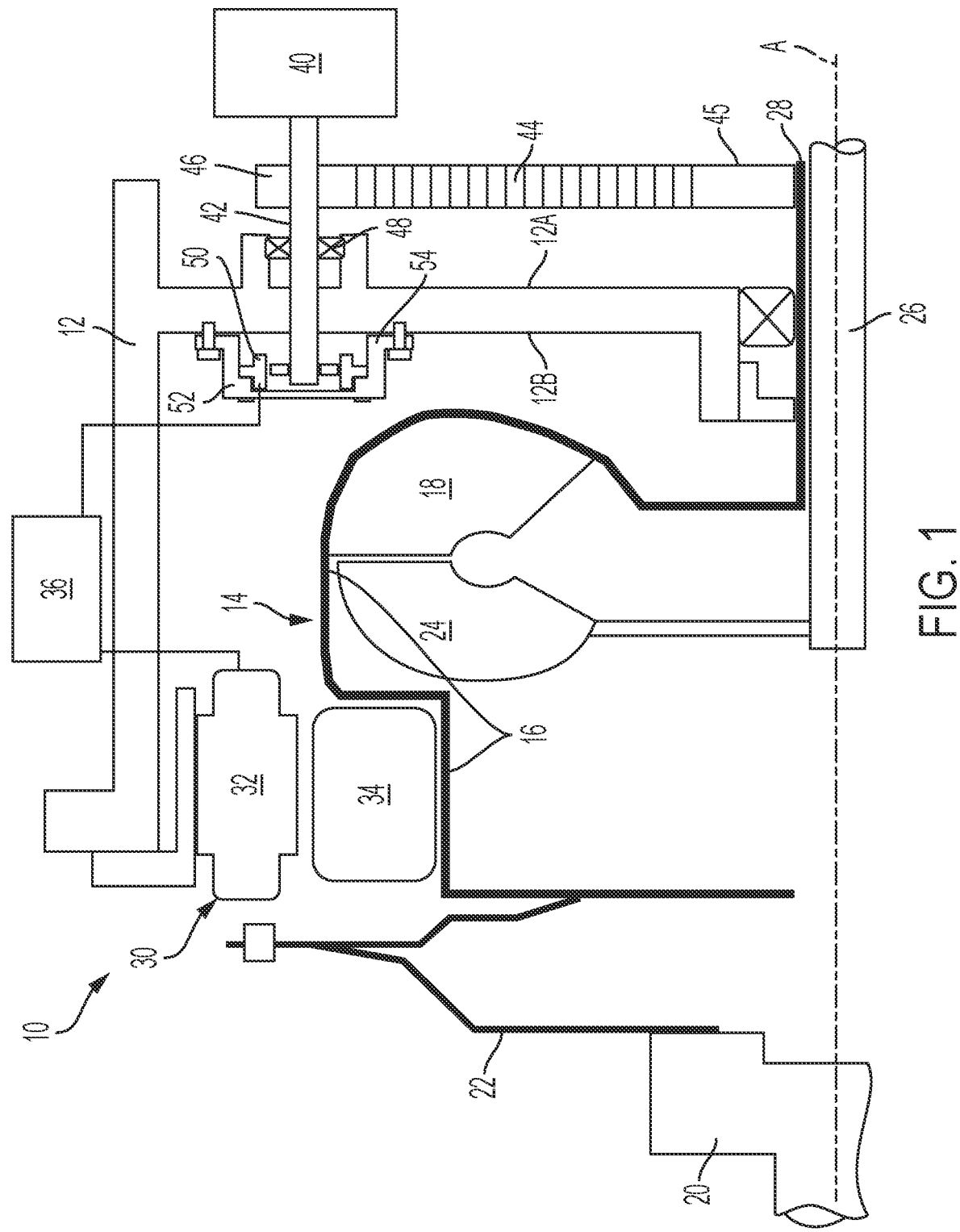
FIG. 1 is a schematic cross-sectional view through a transmission with an integrated hybrid drive according to one embodiment.
Figure 3:
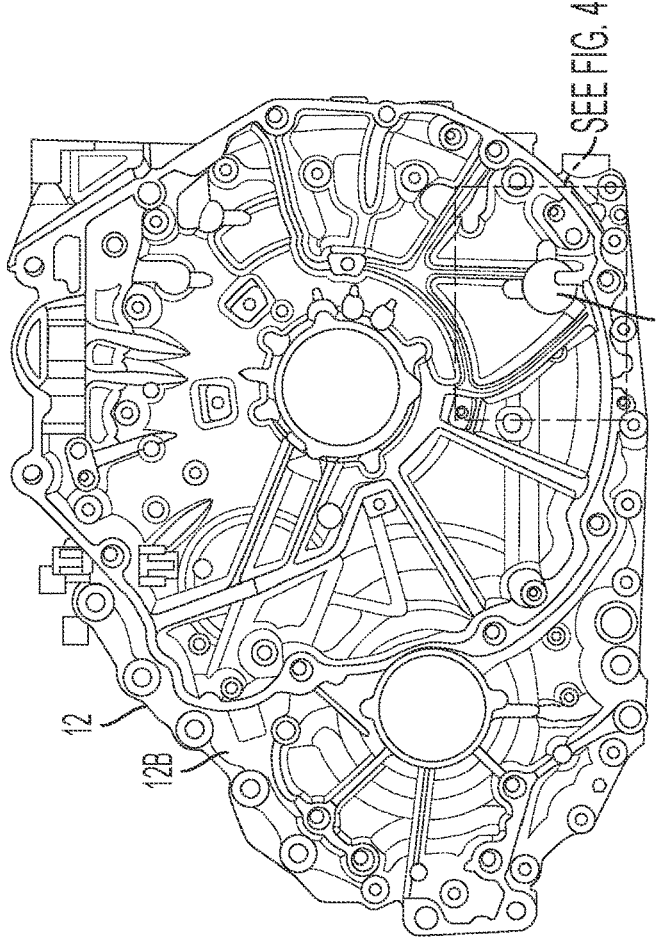
FIG. 3 is a view showing the opposite side of the transmission housing from FIG. 2 with the position of a rotary position sensor.
Figure 4:
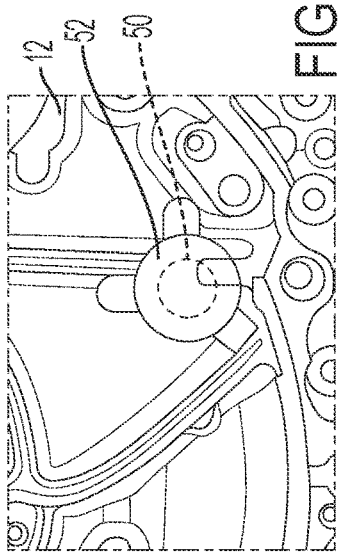
FIG. 4 is an enlarged detailed view taken from FIG. 3.
Figure 2:
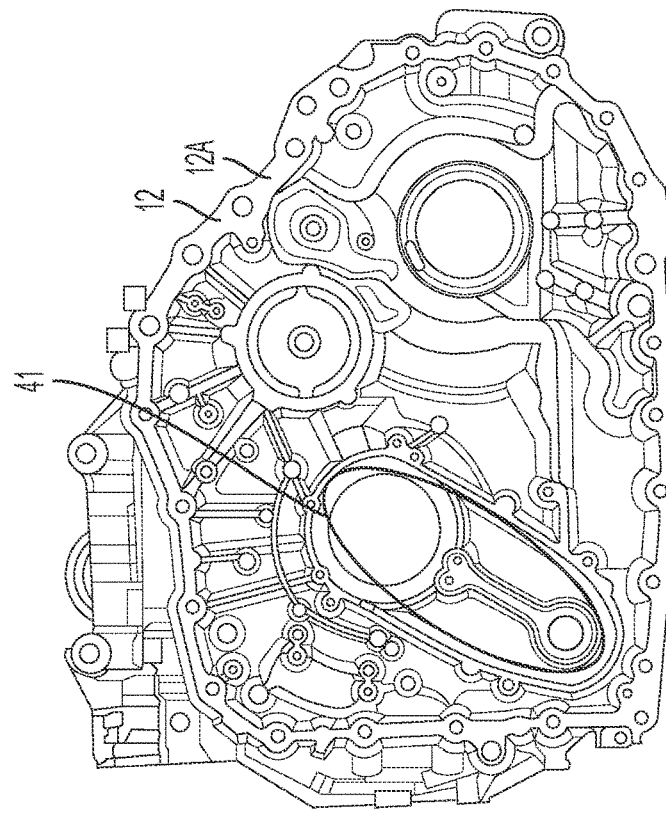
FIG. 2 is a detailed view showing a first side of the transmission housing with an existing auxiliary drive area.

Referring to FIGS. 1-4, a transmission 10 with an integrated hybrid drive is shown. FIG. 1 schematically shows the transmission 10 in half cross-section while FIGS. 2-4 showed details of the transmission housing 12.

The transmission 10 includes a transmission housing 12 along with a torque converter 14 that is rotatably mounted within the transmission housing 12. The torque converter 14 includes an outer shell 16 along with an impeller pump 18 that is configured to be drivingly connected to a crankshaft 20 of an associated internal combustion engine. In a preferred arrangement, a flex plate 22 is located between the crankshaft 20 and the outer shell 16. The flex plate 22 can be of known construction and acts to smooth rotational torque fluctuation from the crankshaft 20 being input to the transmission 10. The torque converter 14 further includes a turbine 24 is connected to an output shaft 26 of the torque converter 14 in order to transfer torque downstream along a driveline between the internal combustion engine and the driven wheels.

An E-motor 30 is located within the transmission housing 12. The E-motor 30 includes a stator 32 connected to the transmission housing 12 as well as a rotor 34 that is connected to the outer shell 16 of the torque converter 14. A controller 36 is also provided for the E-motor 30, and is schematically represented in FIG. 1.

An auxiliary drive unit, such as an oil pump 40, having a drive shaft 42 that is driven by a connection to the torque converter output shell 16 is provided. This is positioned in the auxiliary drive area 41 indicated in FIG. 2 on the transmission housing 12. A rotor position sensor (RPS) 50 is provided on the drive shaft 42 and is configured to signal rotor position data to the controller 36 such that the E-motor 30 can be controlled in use.

The oil pump 40 is located on a side 12A of the transmission housing 12 that is opposite from a torque converter side 12B of the transmission housing 12. The drive shaft 4 extends through the transmission housing 12 and the rotor position sensor 50 is positioned on the torque converter side 12B of the transmission housing 12. One or more bearings 48 can be used to support the drive shaft 42.

In the illustrated embodiment, the torque converter 14 further includes a torque converter pump hub 28, and a chain drive 44 extends between the torque converter pump hub 28 and the drive shaft 42. Here, sprockets 45, 46 are located on the torque converter pump hub 28 and the drive shaft 42, respectively. Other types of drives, such as a direct gear drive could also be utilized in order to drive the driveshaft 42 directly from the torque converter pump hub 28 with little or no lash so that the position of the rotor 34 can be accurately determined.

In one embodiment, a drive ratio of the torque converter pump hub 28 to the drive shaft 42 is 1:1. However, other drive ratios such as 1:2 to 1:6, for example, could be used and the RPS 50 and/or the controller 36 can be configured and/or calibrated to take into account the drive ratio such that the position of the rotor 34 is accurately determined.

As shown in FIGS. 1, 3, and 4, the RPS 50 is mounted to the transmission housing 12 and a resolver housing 52 is mounted over the RPS 50. In one arrangement, the resolver housing 52 is sealed to the transmission housing 12 in order to provide a water-tight enclosure for the RPS 50. Here, a seal 54 can be utilized. Alternatively, an RTV sealant can be applied to the surfaces during installation.

As shown in FIG. 1, this arrangement allows the drive shaft 42 to be mounted parallel to an offset from the axis A of the torque converter 14 which allows for offset positioning of the RPS 50 relative to the axis A of the rotor 34 and the torque converter 14. This allows for better space utilization and eliminates the need for a custom configured rotor position sensing arrangement in a co-axial position with the rotor 34 and the torque converter 14, as was previously known. Further, the present arrangement allows the use of an off-the-shelf position sensor to be used as the RPS 50, which can be a known type of rotary resolver or rotary encoder.

While in a general sense, the auxiliary drive unit could be something other than oil pump 40, and could also just be an offset drive shaft 42 that is driven by the torque converter 14 or the rotor 34, one specific application where an E-motor 30 is being incorporated into an existing envelope of a transmission 10 takes advantage of the space previously assigned to the oil pump 40 as the auxiliary drive unit as well as the existing drive arrangement for the oil pump 40, only requiring modification to the drive shaft 42 so that it is extended in order to accommodate the RPS 50 located within the bell housing 12 of the transmission. Here, in order to meet further requirements on the drive train, the resolver housing 52 is sealingly mounted over the RPS 50 to meet water-tight enclosure requirements for the particular application.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LIST OF REFERENCE NUMERALS

10 Transmission
12 Transmission housing
12A First side of transmission housing
12B Torque converter side of transmission housing
14 Torque Converter
16 Outer shell
18 Impeller pump
20 Crankshaft 22 Flex plate
24 Turbine
26 Output shaft
30 E-motor
32 Stator
34 Rotor
36 Controller
40 Oil pump
41 Auxiliary drive area
42 Drive Shaft
44 Chain drive
45 Sprocket
46 Sprocket
50 Rotor position Sensor
52 Resolver cover
54 Seal
A Axis of torque converter and rotor

What is claimed is:

1. A transmission with an integrated hybrid drive, comprising:
 a transmission housing;
 a torque converter rotatably mounted within the transmission housing, the torque converter including an outer shell with an impeller pump configured to be drivingly connected to a crankshaft, and a turbine connected to an output shaft;
 an e-motor including a stator connected to the transmission housing, a rotor connected to the outer shell, and a controller;
 an auxiliary drive unit having a drive shaft that is driven by a connection to the torque converter outer shell; and
 a rotor position sensor on the drive shaft that is configured to signal rotor position data to the controller.

2. The transmission of claim 1, wherein the auxiliary drive unit is an oil pump.

3. The transmission of claim 2, wherein the oil pump is located on a side of the transmission housing opposite from a torque converter side, and the drive shaft extends through the transmission housing and the rotor position sensor is positioned on the torque converter side of the transmission housing.

4. The transmission of claim 2, wherein the torque converter further comprises a torque converter pump hub, and a chain drive extends between the torque converter pump hub and the drive shaft.

5. The transmission of claim 4, wherein a drive ratio of the torque converter pump hub to the drive shaft is 1:1.

6. The transmission of claim 4, wherein a drive ratio of the torque converter pump hub to the drive shaft is greater than 1:1 and at least one of the rotor position sensor or the controller is configured to take into account the drive ratio in determining the position of the rotor.

7. The transmission of claim 1, wherein the rotor position sensor is mounted to the transmission housing, and a resolver housing is mounted over the rotor position sensor.

8. The transmission of claim 7, wherein the resolver housing is sealed to the transmission housing to provide a water-tight enclosure for the rotor position sensor.

9. The transmission of claim 1, further comprising a flex plate drivingly connected to the torque converter outer shell, wherein the flex plate is configured to be connected to the crankshaft.

10. The transmission of claim 1, wherein the auxiliary drive unit is located on a side of the transmission housing opposite from a torque converter side, and the drive shaft extends through the transmission housing and the rotor position sensor is positioned on the torque converter side of the transmission housing.

11. The transmission of claim 1, wherein the drive shaft is mounted parallel to and offset from an axis of the torque converter.

12. The transmission of claim 1, wherein the rotor position sensor is a rotary resolver or encoder.

13. A transmission with an integrated hybrid drive, comprising:
 a transmission housing;
 a torque converter rotatably mounted within the transmission housing, the torque converter including an outer shell and a pump hub;
 an e-motor including a stator connected to the transmission housing, a rotor connected to the outer shell, and a controller;
 an oil pump having a drive shaft that is driven by a connection to the torque converter pump hub; and
 a rotor position sensor on the drive shaft that is configured to signal rotor position data to the controller.

14. The transmission of claim 13, wherein the oil pump is located on a side of the transmission housing opposite from a torque converter side, and the drive shaft extends through the transmission housing and the rotor position sensor is positioned on the torque converter side of the transmission housing.

15. The transmission of claim 14, wherein the rotor position sensor is mounted to the transmission housing, and a resolver housing is mounted over the rotor position sensor.

16. The transmission of claim 15, wherein the resolver housing is sealed to the transmission housing to provide a water-tight enclosure for the rotor position sensor.

17. The transmission of claim 13, wherein the drive shaft is mounted parallel to and offset from an axis of the torque converter.

18. The transmission of claim 13, wherein the rotor position sensor is a rotary resolver or encoder.

* * * * *